Oct. 16, 1951 C. F. WEIGANDT 2,571,980
FISH LURE
Filed Sept. 8, 1949
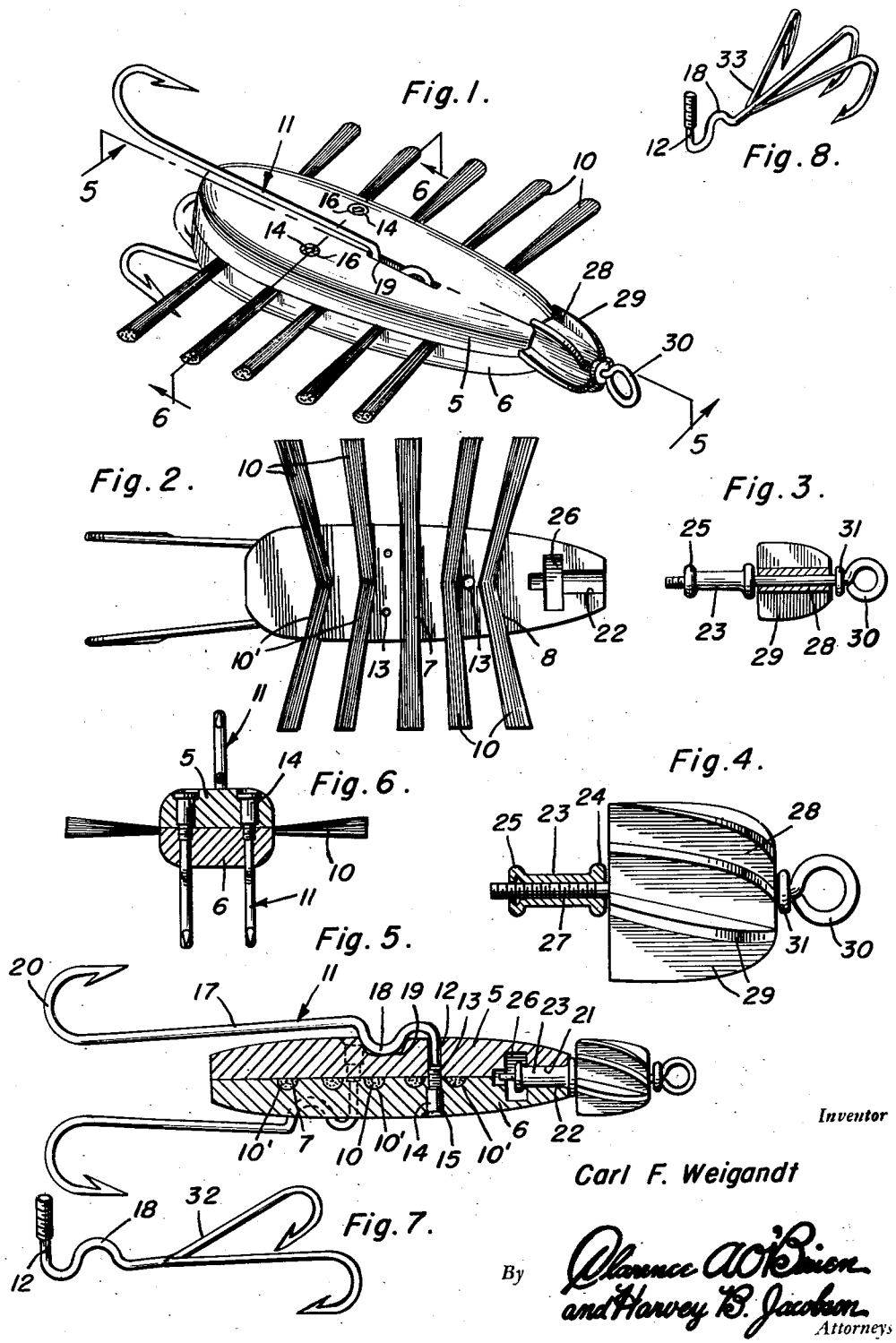
Inventor
Carl F. Weigandt Patented Oct. 16, 1951

2,571,980

UNITED STATES PATENT OFFICE 2,571,980

FISH LURE

Carl F. Weigandt, Memphis, Tenn., assignor of forty-nine per cent to Wylie E. Turner, Jr., Piggott, Ark.

Application September 8, 1949, Serial No. 114,545

1 Claim. (Cl. 43—42.16)

The present invention relates to new and useful improvements in fish lures and more particularly to a lure shaped to simulate a bug.

An important object of the invention is to provide a fish lure including a body composed of easily assembled sections for interchangeably using differently colored or ornamented parts to suit the fancy of the fisherman or in accordance with changing conditions.

Another object is to provide novel means for attaching hooks to the body and utilizing the hooks to hold the sections of the body in assembled relation, as well as for holding a spinning head in position at the front end of the body.

A further object is to provide a novel hook construction with means for holding the hook firmly on the body in a fixed position to eliminate dangling of the hook and the objections thereto.

A still further object is to provide a fish lure of simple and practical construction, which is efficient and reliable in use, neat and attractive in appearance, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a perspective view;

Figure 2 is a top plan view with the top body section removed;

Figure 3 is a longitudinal sectional view of the head;

Figure 4 is an enlarged side elevational view of the head with the bearing shown in section;

Figure 5 is a longitudinal sectional view taken on a line 5—5 of Figure 1;

Figure 6 is a transverse sectional view taken on a line 6—6 of Figure 1; and

Figures 7 and 8 are perspective views of double and triple hooks.

Referring now to the drawing in detail, wherein, for the purpose of illustration, I have disclosed a preferred embodiment of my invention, the numerals 5 and 6 designate a pair of flat ovate body sections positioned in confronting relation to each other and with the outer edges of the sections rounded. The confronting face of section 6 is formed with transverse grooves 7 including front grooves 8 which incline forwardly at each side of the longitudinal axis of the body and rear grooves 9 which incline rearwardly. Groups of bristles or hairs 10 are positioned in the grooves to project outwardly at each side of the body and are held in the grooves by the assembling of the sections together. The hairs of each group 10 are centrally bound together as at 10'.

The body sections are held in assembled relation by means of hooks 11 having angular inner ends 12 inserted in vertical openings 13 in the body sections and threading the ends 12 to receive cylindrical nuts 14 having flared outer ends 15 countersunk in the body. The outer ends of the nuts are formed with screwdriver slots 16 to tighten or remove the nuts.

The shank 17 of the hook extends longitudinally along the body in a rearward direction from its attached end and is formed with a U-shaped bend 18 adjacent its front end seated in a recess 19 in the outer surface of the body to prevent turning or swinging movement of the hook and to hold the bill 20 of the hook in a rearwardly projecting position from the body. Both the top and bottom of the body is provided with one or more of the hooks and with the bill portion of the upper hook held upwardly and with the bill portion of the lower hook or hooks held downwardly.

The confronting face of body sections 5 and 6 at their front ends are formed with matching longitudinal grooves 21 and 22 tightly receiving a sleeve 23 having front and rear flanges 24 and 25. The rear flange 25 is positioned in a chamber 26 at the rear ends of grooves 21 and 22 to hold the sleeve in the body and the front flange 24 is positioned against the front end of the body.

The sleeve is threaded on the rear end of a stationary shaft or stem 27 having a smooth front end on which a spinning head 28 is rotatably mounted and formed with spiral vanes 29. A line attaching eye 30 is formed at the front end of stem 27 with a washer 31 between the eye and the head, while the rear end of the head bears against front flange 24 of bearing 23.

The hooks may be of a single type, as shown in Figures 1 and 2, or may be constructed to provide double hooks, as shown at 32 in Figure 7, or triple hooks as shown at 33 in Figure 8.

The body sections 5 and 6 may be constructed of suitable material and colored or ornamented to suit the fancy of the individual, whereby body sections of various color combinations may be interchangeably assembled and secured together by the hooks 11.

The spinning head 28 rotates as the lure is drawn through the water by a line attached to eye 30 to thus attract fish.

Having described the invention, what is claimed as new is:

An artificial bait comprising a body composed of a pair of separable sections, said sections having means holding the sections in assembled relation confronting each other, and being formed with matching grooves in the confronting surfaces of the sections at one end of the body a chamber at the inner ends of the grooves, a sleeve tightly seated in the grooves and having a flange at its inner end seated in the chamber to hold the sleeve in the body and with a shaft secured in the sleeve and projecting forwardly of the body, a spinning head journaled on the front end of the shaft, and a line-attaching eye at the front end of the shaft forwardly of the head.

CARL F. WEIGANDT.

REFERENCES CITED

The following references are of record in the file of this patent:

UNITED STATES PATENTS

| Number | Name | Date |
|---|---|---|
| 1,002,981 | Ford | Sept. 12, 1911 |
| 1,230,968 | Wilber et al. | June 26, 1917 |
| 1,237,529 | Kuroki | Aug. 21, 1917 |
| 1,264,627 | Foss | Apr. 30, 1918 |
| 1,309,966 | Sebenius | July 15, 1919 |
| 1,540,586 | Adams | June 2, 1925 |
| 1,774,976 | Huntington | Sept. 2, 1930 |
| 2,003,366 | Jordan | June 4, 1935 |
| 2,039,039 | Steen | Apr. 28, 1936 |
| 2,088,669 | Shutter | Aug. 3, 1937 |
| 2,121,474 | Bowering | June 21, 1938 |
| 2,224,389 | Haselwood | Dec. 10, 1940 |
| 2,298,691 | Greggains | Oct. 13, 1942 |
| 2,311,985 | Heddon | Feb. 23, 1943 |